Dec. 20, 1966   E. R. REYNOLDS   3,292,282
LAND PLANE
Filed May 14, 1964   2 Sheets-Sheet 2
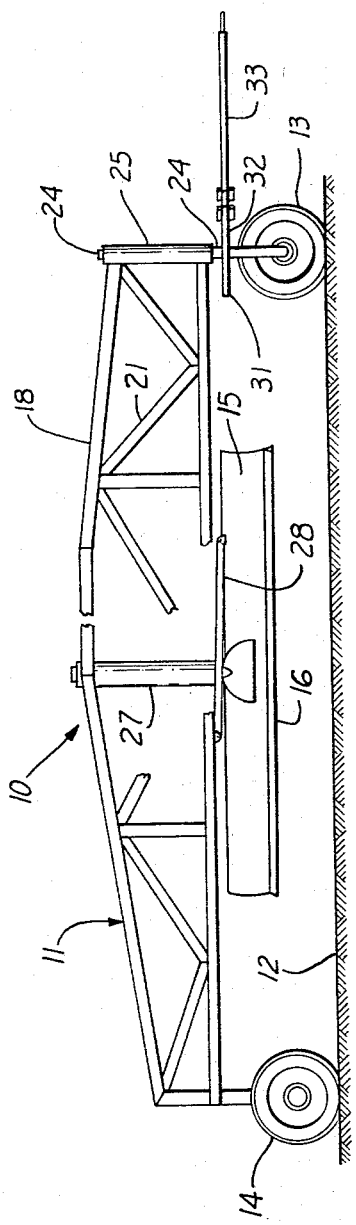
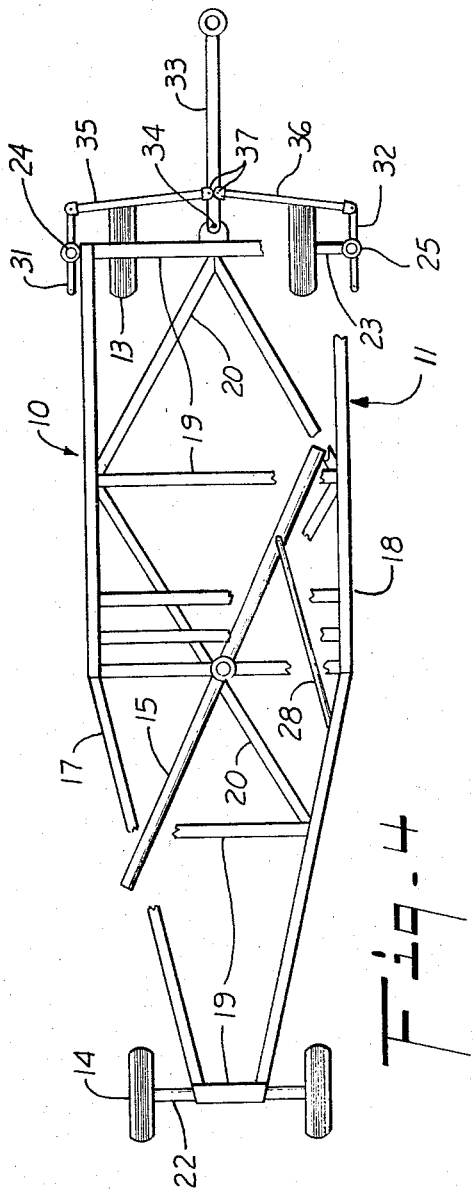
EUGENE R. REYNOLDS
INVENTOR.
BY
Browning, Simms, Hyer
& Eickenroht
ATTORNEYS

United States Patent Office 3,292,282
Patented Dec. 20, 1966

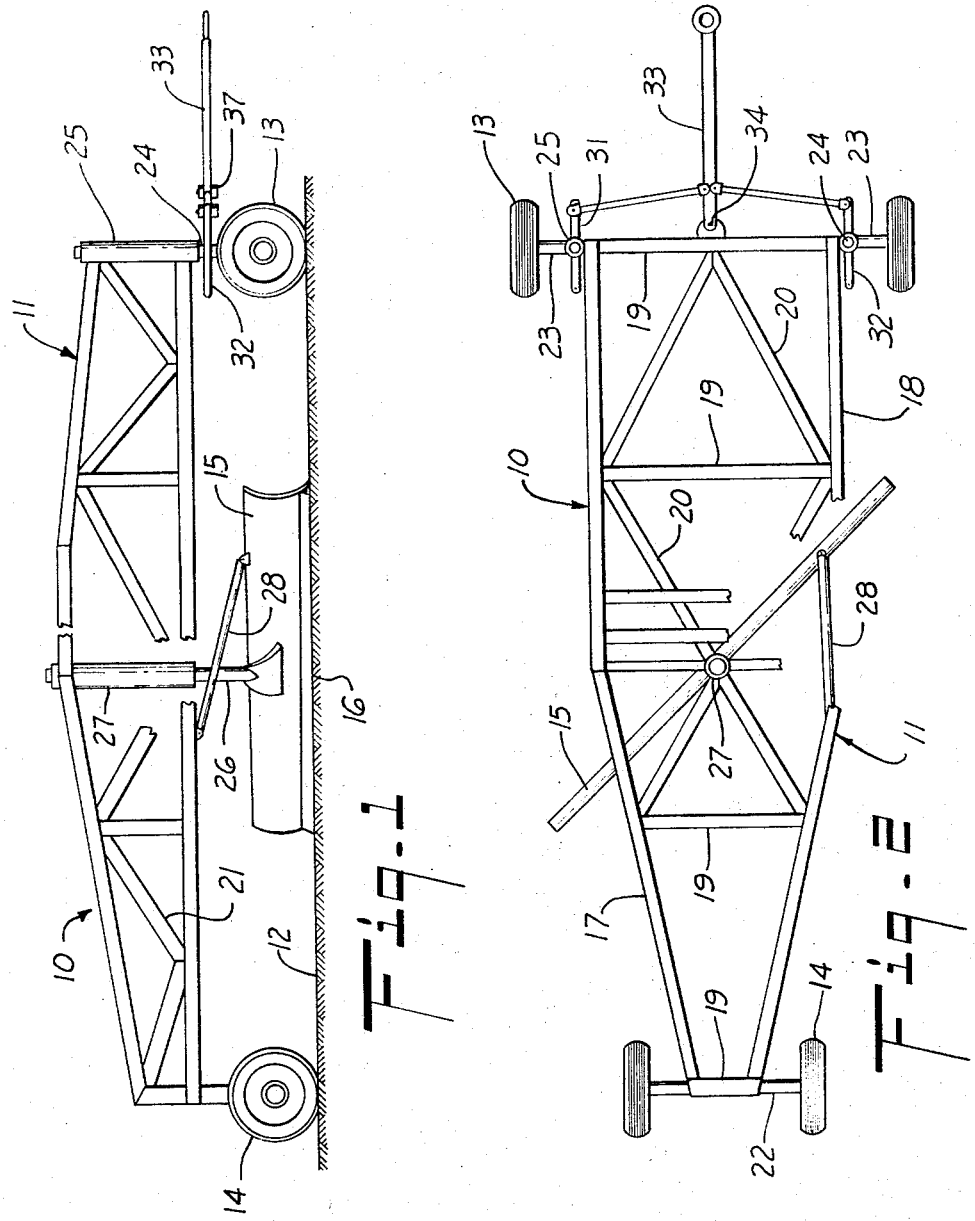

3,292,282
LAND PLANE
Eugene R. Reynolds, McAllen, Tex., assignor to Reynolds Research & Manufacturing Corporation, McAllen, Tex., a corporation of Texas
Filed May 14, 1964, Ser. No. 367,505
7 Claims. (Cl. 37—179)

This invention relates generally to land planes; and, more particularly, to improvements in relatively wide land planes which are intended for transport over public highways.

In the conventional land plane, a ground working blade is supported transversely across a longitudinally extending frame and intermediate laterally spaced-apart wheels on the front and rear ends of the frame. Preferably, these wheels are steerable in much the same manner as those of an automobile—i.e., on separate axles which pivot about laterally spaced-apart axes on the frame.

Each time an implement of this type passes over a plot of ground, it usually forms a windrow or ridge of spilled soil at each end of the blade. It is desirable, therefore, to space the front wheels a wide distance apart so that, as the operator makes a pass along an adjacent portion of the ground, he may dispose one front wheel on the smoothed or planed side of the windrow. Thus, unless the one wheel is so disposed, it will not cooperate with the rear wheel or wheels in "reading" the ground elevations and thus maintaining the blade cutting edge at the proper elevation. In other words, if such wheel moves over either the windrow or the unsmoothed land adjacent the windrow, it will either lift or lower the blade cutting edge from the desired elevation.

Also, in order to lend stability to the land plane, it is desirable to dispose the rear wheels either close together or wide apart, and particularly outboard of the ends of the blades. Therefore, in some cases, the rear wheels as well as the front wheels may be widely spaced apart, while, in other cases, only the rear wheels are widely spaced apart, as when the front of the frame of the land plane is supported from the draw bar of a towing vehicle.

In any case, this wide spacing of one or both sets of wheels of a land plane creates problems of transportation as the blades become wider. Thus, these wheels are the controlling factor in determining the side clearances of the implement, because the frame width need not be great and the effective lateral dimension between the opposite ends of the blade may be reduced in a number of convenient ways.

An object of this invention is to provide a land plane in which the wheels are so supported on the frame that they may be moved to positions for transport in which they have no greater effective lateral dimensions than the remaining parts of such land plane.

A more particular object of this invention is to provide a quick or easy way for moving the wheels between outboard and inboard positions relative to the sides of the frame, even when they are connected to an automobile type steering mechanism.

Other objects, advantages and features of this invention will become apparent to one skilled in the art upon consideration of the written description, the attached claims and the annexed drawings.

In the drawings, wherein like reference characters are used throughout to designate like parts:

FIG. 1 is a side elevational view of a land plane constructed in accordance with the present invention and with the blade thereof lowered to ground working position;

FIG. 2 is a top plan view of the land plane shown in FIG. 1, and illustrating the outboard position of the front wheels thereof during the ground working operation;

FIG. 3 is a side elevational view of the land plane, similar to FIG. 1, but with the blade lifted for transport; and FIG. 4 is a top plan view of the land plane illustrating the inboard positions of both the front wheels and blade thereof in the transporting position of FIG. 3.

With reference now to the details of the above-described drawings, the illustrated land plane, which is designated in its entirety by reference character 10, includes a frame 11 extending longitudinally of its direction of travel (from left to right) and supported above ground level 12 by means of front wheels 13 and rear wheels 14. A blade 15 is carried transversely across the frame intermediate the front and rear wheels for vertical movement between the lowered ground working position of FIG. 1 and the raised transport position of FIG. 3. As can be seen from FIG. 1, in the working position of the blade, its lower edge 16 is disposed in substantial alignment with the lower edges of the wheels 13 and 14.

The frame 11 comprises side members 17 and 18 consisting of laterally spaced-apart trusses and cross members 19 extending between the side members. Additionally, there are braces 20 and 21 extending diagonally between the side members 17 and 18 and the upper and lower rails of each truss, respectively.

As shown in FIGS. 2 and 4, the rear wheels 14 are mounted upon a common axle 22 supported from the rear end of the frame 11. More particularly, the side members 17 and 18 of the frame taper toward one another at the rear end of the frame, and the rear wheels 14 are mounted on the axle 22 relatively close to the opposite sides of the rear end of the frame. In this manner, and as can be seen from FIGS. 2 and 4, the rear wheels are inboard of the opposite sides of the frame at its widest extent toward its front end.

Each of the front wheels 13 is mounted on a separate wheel assembly including an axle 23 extending laterally from a post or pin 24 which is rotatably received within a sleeve 25 on each side of the front end of the frame 11. Thus, each wheel 13 is pivotal about a vertical axis substantially adjacent each such side of the frame, so that, whether the front wheels are disposed outboard of the frame, as shown in FIG. 2, or inboard of the frame, as shown in FIG. 4, they may be steered in much the same manner of automobile wheels, as will be described in more detail to follow.

The midportion of the blade 15 is supported from the lower end of a rod 26 which, in turn, extends downwardly from a piston (not shown) reciprocable within a cylinder 27 carried by the frame 11. Hydraulic fluid may be introduced to the cylinder on opposite sides of the piston for raising and lowering the blade in an obvious manner. The cylinder 27 is fixed in a vertical position by the connection of its upper end to cross member 19 and its lower end to diagonal bracing 20, and a link 28 is pivotally connected at one end to the lower edge of frame member 18 and at its other end to the upper edge of the blade 15 forwardly of the connection of piston rod 26 to the blade. Thus, with the piston rod 26 freely rotatable within the cylinder 27, the blade is swung about the vertical axis of the cylinder in moving between the outboard and inboard positions of FIGS. 2 and 4, respectively.

As shown in FIG. 2, and for reasons previously described, in their outboard positions, the front wheels 13 are spaced widely apart, and preferably at least partly laterally outwardly of the ends of the blade 15 in the ground working position of the blade. In their inboard positions, on the other hand, and as shown in FIG. 4, the front wheels are disposed inwardly of the sides of the frame as well as the lateral extension of the blade in the transport position. More paricularly, both the front and rear wheels as well as the blade are disposable inwardly of the sides of the frame 11, as shown in FIG. 4, so that neither the blades nor the wheels determine the side-by-side clearance of the land plane.

With reference now to the details of the mechanism for steering the front wheels 13 and also moving them between their inboard and outboard positions, there is an arm 31 extending from one side of each post 24 as well as an arm 32 extending from the other side of such post in longitudinal alignment with the arm 31. More particularly, each of the arms 31 and 32 is on the same horizontal level and has a hole through its outer end which is spaced an equal distance from the pivotal axis of the post 24 to which it is connected. These arms may be described as extending "forwardly" and "rearwardly" depending on the positions of the wheels 13 either outboard or inboard of the frame. That is, in the inboard position of the wheels, the arms 32 extend forwardly from the post 24 and the arms 31 extend rearwardly therefrom, while in the outboard position thereof, arms 31 extend forwardly and arms 32 rearwardly from the post.

A draw bar 33 is pivotally connected at 34 to cross member 19 at the front end of the frame for swinging about a vertical axis generally intermediate and equidistant the pivotal axes of posts 24. The forward end of this bar is formed in any suitable manner for connection with a hitch or other means for attachment to a vehicle for moving the implement forwardly from left to right.

In order to impart the direction of movement of the towing vehicle to the front wheels of the land plane, the draw bar 33 is linked to the arms 31 or 32 extending from opposite sides of the post 24. As shown in FIGS. 2 and 4, this linkage comprises a first link 35 pivotally connected at its outer end to one such arm and at its inner end to the draw bar, and a second link 36 pivotally connected at its outer end to the other such arm and its inner end to the draw bar, both such connections to the draw bar being shown at 37 to be forward of the pivotal connection 34. Obviously, the links 35 and 36 are of equal length intermediate their pivotal connections, so that, as well known in the art of automobile type steering mechanisms, the wheels 13 are caused to be pivoted in unison in response to steering of the towing vehicle.

Upon removal of the pins connecting the outer ends of the links 35 and 36 to their respective arms 31 or 32, the posts 24 and thus the wheels 13 may be swung 180° between inboard and outboard positions. In this way, the oppositely extending arms on the posts are disposed for pivotal connection to the links 35 and 36, so that the wheels are properly connectable through the above-described linkage in both such positions.

When it is desired to so shift the wheels, the blade 15 may be forced downwardly against the ground 16 so as to relieve the force with which the wheels 13 engage the ground. This facilitates not only the removal of the pins pivotally connecting the linkage to the arms, but also facilitates turning of each wheel and its assembly through 180°. Upon reconnection of the linkage to the opposite arms, the force on the blade may be relieved to return the wheels into firm engagement with the ground.

From the foregoing it will be seen that this invention is one well adapted to attain all of the ends of objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

This invention having been described, what is claimed is:

1. A land plane, comprising a longitudinally extending frame having at least one pair of laterally spaced-apart wheels for movement forwardly over the ground, a blade supported on the frame and extending transversely thereof, each of said pair of wheels having an axle extending laterally from an upright post rotatably mounted on one side of the frame, arms extending generally forwardly and rearwardly from each post, a draw bar pivotally connected to the frame intermediate the posts, linkage pivotally connected between the draw bar and each of the forwardly extending arms, the pivotal connections of the linkage and arms being releasable to permit said arms to be reversed end for end and thereby dispose the wheels between inboard and outboard positions relative to said posts, and means for releasably pivotally connecting the linkage to each of the rearwardly extending arms when said arms have been so reversed.

2. A land plane of the character defined in claim 1, including means for reducing the lateral extension of the ends of the blades from a width in which they are outboard of the frame to one in which they are inboard of the frame.

3. A land plane, comprising a longitudinally extending frame, a ground working blade supported on the frame and extending transversely across an intermediate portion thereof, means supporting a pair of laterally spaced-apart wheels from at least one end of the frame to permit the frame to be moved forwardly over the ground, the support means for each wheel of the pair of wheels including a sleeve on the frame, and a wheel assembly comprising an axle for the wheel having an upright post rotatably mounted in the sleeve, and means for steering said wheels including, arms extending generally forwardly and rearwardly from each wheel assembly, a generally longitudinally extending bar pivotally connected to the frame intermediate said sleeves, and linkages extending and releasably and selectively pivotally connecting the forwardly and rearwardly extending arms on the wheel assemblies to the bar, whereby the wheels may be swung with the assemblies between positions inboard and outboard with respect to the frame sleeves.

4. A land plane of the character defined in claim 3, including means for reducing the lateral extension of the ends of the blades from a width in which they are outboard of the frame to one in which they are inboard of the frame.

5. In a land plane, comprising a longitudinally extending frame, a ground working blade supported on the frame and extending transversely across an intermediate portion thereof, a pair of laterally spaced-apart wheels supported from at least one end of the frame, whereby the frame may be moved forwardly over the ground: the improvement comprising a sleeve on each side of said one end of the frame, and an assembly for each wheel of said pair of wheels, including an axle having an upright post rotatably mounted in the sleeve, and means for steering said wheels including, a draw bar pivotally connected to the frame intermediate the sleeves thereon, arms extending generally forwardly and rearwardly from each wheel assembly, linkage pivotally connected to the bar forwardly of the pivotal connection of said bar to the frame, and means releasably pivotally connecting the linkage selectively to the forwardly and rearwardly extending arms of the wheel assembly, whereby the wheels may be swung between inboard and outboard positions relative to the frame.

6. In a land plane of the character defined in claim 5, including means for reducing the lateral extension of the ends of the blades from a width in which they are outboard of the frame to one in which they are inboard of the frame.

7. A land plane, comprising a longitudinally extending frame having a pair of laterally spaced-apart wheels on at least one end, a blade supported on the frame and extending transversely of an intermediate portion thereof for working the ground as the frame moves thereover, each wheel of said pair of wheels having a separate axle which is pivotable about a vertical axis spaced laterally from the axis about which the other axle pivots, means for swinging said wheels about said axes between inboard and outboard positions relative to the frame, and means for reducing the lateral extension of the ends of the blade from a width in which they are outboard of the frame to one in which they are inboard of the frame.

References Cited by the Examiner

UNITED STATES PATENTS

| | | | |
|---|---|---|---|
| 273,224 | 2/1883 | Carver | 172—507 |
| 2,581,533 | 1/1952 | Hipple | 37—169 |
| 2,628,848 | 2/1953 | Isaac | 37—180 XR |
| 2,843,948 | 7/1958 | Lindeman | 37—178 |
| 2,857,725 | 10/1958 | Canfield | 56—25.4 |
| 3,081,567 | 3/1963 | Saul | 37—152 |

FOREIGN PATENTS 408,379   1/1925   Germany.

ABRAHAM G. STONE, *Primary Examiner.*

JOE O. BOLT, JR., WILLIAM A. SMITH III,
*Examiners.*